United States Patent
Beckwith et al.

(10) Patent No.: US 11,769,212 B2
(45) Date of Patent: Sep. 26, 2023

(54) PREDICTIVE CLAIMS PLATFORM FOR MANAGING REPAIRS

(71) Applicant: Allstate Insurance Company, Northbrook, IL (US)

(72) Inventors: Richard K. Beckwith, Round Lake Beach, IL (US); Joel T. Dewall, Libertyville, IL (US); Clint J. Marlow, Barrington Hills, IL (US); John A. Riggio, Mundelein, IL (US); Charles E. Sulkala, Grayslake, IL (US); Robert L. Trinco, Schaumburg, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/670,253

(22) Filed: Feb. 11, 2022

(65) Prior Publication Data
US 2022/0164895 A1 May 26, 2022

Related U.S. Application Data

(63) Continuation of application No. 15/176,426, filed on Jun. 8, 2016, now abandoned.

(51) Int. Cl.
*G06Q 40/00* (2023.01)
*G06Q 40/08* (2012.01)
(Continued)

(52) U.S. Cl.
CPC ....... *G06Q 40/08* (2013.01); *G06Q 10/06395* (2013.01); *G07C 5/008* (2013.01)

(58) Field of Classification Search
CPC .............................. G06Q 40/00; G06Q 40/08
See application file for complete search history.

(56) References Cited

U.S. PATENT DOCUMENTS

2010/0198637 A1   8/2010   Jenkins et al.
2014/0081675 A1   3/2014   Ives et al.
(Continued)

FOREIGN PATENT DOCUMENTS

IN   202211070101 A   * 12/2022

OTHER PUBLICATIONS

Making sustainability real: how a process-centered environment supports sustainability, Willsey, Marie; Albright, Brian; Barone, Charlie; Mencfeld, Kelly. BodyShop Business29.12: S4(6). Babcox Media, Inc. (Dec. 2010) (Year: 2010).*
(Continued)

*Primary Examiner* — Lalita M Hamilton
(74) *Attorney, Agent, or Firm* — Foley & Lardner LLP

(57) ABSTRACT

A system for a predictive claims computing platform may comprise a plurality of vehicles, a computing device associated with a repair facility, a network, and a server. The server may be configured to determine an insurance coverage type needed for repairing each vehicle in the plurality of vehicles, identify a location of the repair facility for repairing each vehicle, assign a standard amount to reimburse the repair facility for repairing each vehicle based on insurance coverage type and the location of the repair facility, transmit the standard amount to the computing device associated with the repair facility, receive from the computing device, a cost for actual repair of each vehicle after the actual repair for each vehicle has been completed, and adjust the standard amount to reimburse the repair facility for future repairs based on identifying a difference between the standard amount and the actual repair cost for each vehicle.

20 Claims, 4 Drawing Sheets

(51) Int. Cl.
*G07C 5/00* (2006.01)
*G06Q 10/0639* (2023.01)

(56) References Cited

U.S. PATENT DOCUMENTS

2015/0213556 A1   7/2015   Haller, Jr.
2016/0239921 A1   8/2016   Bray et al.

OTHER PUBLICATIONS

Willsey, et al., "Making sustainability real: how a process-centered environment supports sustainability," BodyShop Business S4(6), 10 pages (2010).

* cited by examiner

PREDICTIVE CLAIMS PLATFORM FOR MANAGING REPAIRS

CROSS-REFERENCE TO RELATED APPLICATIONS

This application is a continuation of U.S. patent application Ser. No. 15/176,426 filed Jun. 8, 2020. The contents of these applications are incorporated herein in their entirety by reference.

BACKGROUND

Insurance companies or providers may utilize various resources and information for providing services to customers. For example, insurance providers may rely on resources, such as claims adjusters to inspect and verify damage to a vehicle and to assist insured customers or users in processing their insurance claims after an accident. In insurance claim processing, a customer may file an insurance claim, and the insurance claim may go through a process that leads to a settlement (e.g., obtaining an estimate, taking the estimate to a service center or repair facility, determining a final cost, and the like).

Nevertheless, insurance claim processing and estimation processes may often be time-consuming, expensive, inaccurate, and complex. For example, estimation of repair value may typically be performed by an individual who is highly trained in vehicle repair estimation, however, these individuals may be relatively expensive to obtain due to the high work load and time involved in estimation. Furthermore, an estimate provided by an adjuster may often be modified to reflect actual repair costs after the repair is completed. This process may be inefficient for both the insurance provider and the repair facility and may result in lengthy negotiations and friction in the relationship between the insurance provider, the customer, and the repair facility.

As such, new systems, methods, and devices may be desired to assist in enhancing various processes for insurance providers and repair facilities and providing data and resources in an improved and efficient manner.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing computerized methods, systems, devices, and apparatuses for a predictive and/or interactive tool for streamlining claims processing for insurance providers and repair facilities. For example, insurance providers and repair facilities may benefit from the predictive claims computing platform disclosed herein for determining standard amounts for repairing vehicles without having to provide an estimate prior to repair. The systems and arrangements disclosed herein may allow insurance providers to improve customer service, improve cycle time, and manage costs, while fostering beneficial relationships with repair facilities and customers.

The disclosure describes a system comprising a plurality of vehicles, a computing device associated with a repair facility; a network, and a server, comprising hardware including one or more processor and memory. The server may be configured to determine, by one or more computing devices, a type of insurance coverage needed for repairing each vehicle in a plurality of vehicles based on damage to each vehicle, identify, by the one or more computing devices, a location of a repair facility for repairing the damage to each vehicle, assign, by the one or more computing devices, a standard amount to reimburse the repair facility for repairing each vehicle based on the type of insurance coverage needed and the location of the repair facility, transmit, by the one or more computing devices, the standard amount to a computing device associated with the repair facility, receive, from the computing device associated with the repair facility, a cost for actual repair of each vehicle in the plurality of vehicles after the actual repair for each vehicle has been completed, and adjust, by the one or more computing devices, the standard amount to reimburse the repair facility for future repairs based on identifying a difference between the standard amount and the cost for actual repair of each vehicle.

The disclosure also describes an apparatus comprising at least one processor, a network interface configured to communicate, via a network, with one or more computing devices, and a memory storing computer-readable instructions that, when executed by the at least one processor, cause the apparatus to determine, by one or more computing devices, a type of insurance coverage needed for repairing each vehicle in a plurality of vehicles based on damage to each vehicle, identify, by the one or more computing devices, a location of a repair facility for repairing the damage to each vehicle, assign, by the one or more computing devices, a standard amount to reimburse the repair facility for repairing each vehicle based on the type of insurance coverage needed and the location of the repair facility, transmit, by the one or more computing devices, the standard amount to a computing device associated with the repair facility, receive, from the computing device associated with the repair facility, a cost for actual repair of each vehicle in the plurality of vehicles after the actual repair for each vehicle has been completed, and adjust, by the one or more computing devices, the standard amount to reimburse the repair facility for future repairs based on identifying a difference between the standard amount and the cost for actual repair of each vehicle.

In addition, aspects of this disclosure provide a method that includes determining, by one or more computing devices, a type of insurance coverage needed for repairing each vehicle in a plurality of vehicles based on damage to each vehicle, identifying, by the one or more computing devices, a location of a repair facility for repairing the damage to each vehicle, assigning, by the one or more computing devices, a standard amount to reimburse the repair facility for repairing each vehicle based on the type of insurance coverage needed and the location of the repair facility, transmitting, by the one or more computing devices, the standard amount to a computing device associated with the repair facility, receiving, from the computing device associated with the repair facility, a cost for actual repair of each vehicle in the plurality of vehicles after the actual repair for each vehicle has been completed, and adjusting, by the one or more computing devices, the standard amount to reimburse the repair facility for future repairs based on identifying a difference between the standard amount and the cost for actual repair of each vehicle.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example, and is not limited by, the accompanying figures in which like reference numerals indicate similar elements and in which.

DETAILED DESCRIPTION

Figure 1:
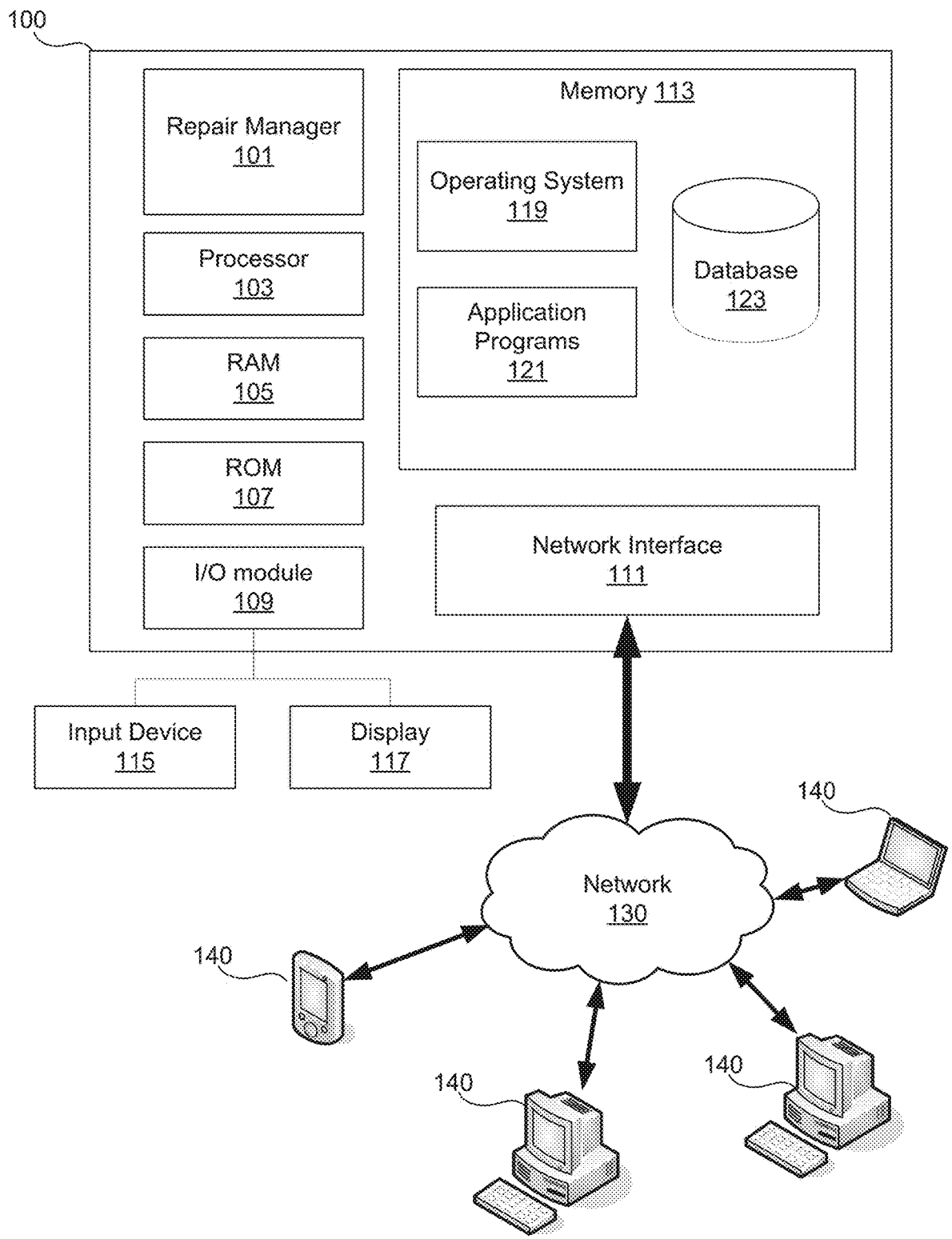
FIG. 1 depicts a block diagram of an example repair device that may be used in accordance with one or more example embodiments.

In accordance with various aspects of the disclosure, computerized methods, systems, devices, and apparatuses are disclosed that provide a predictive claims computing platform for managing repairs, calculating costs, and streamlining processes between insurance providers and repair facilities. By allowing insurance providers to interface with repair facilities (e.g., repair shops, body shops, and the like), the predictive claims computing platform may be useful in improving the functioning of devices associated with insurance claims processing for repairing vehicles, including providing insurance claims processing in an efficient manner.

The predictive claims computing platform may manage repairs for a plurality of vehicles by identifying a type of insurance coverage needed for repairing each vehicle based on damage to each vehicle. In some embodiments, the predictive claims computing platform may determine that a vehicle may need collision insurance coverage or liability insurance coverage to repair damage. For example, collision insurance coverage may cover expenses related to damage or destruction to a vehicle that has been in a roadside incident or collision, whereas liability insurance coverage may cover expenses for damages for when an insured driver is at fault for causing damages to another party's (e.g., a third party's) vehicle.

The predictive claims computing platform may further identify a geographic location of a repair facility (e.g., based on geotag data or based on GPS coordinates of a vehicle) for repairing the damage to each vehicle in the plurality of vehicles, and assign a standard amount to reimburse the repair facility for repairing each vehicle based on the type of insurance coverage needed and the geographic location of the repair facility. Rather than determining a detailed estimate of the expected actual cost of repair, the predictive claims computing platform may determine and assign a standard amount (e.g., a fixed predicted amount of money for each repair claim) that the insurance provider pays for each repair claim or type of repair claim, regardless of the amount of repair work that will be needed for the plurality of vehicles. For example, the insurance provider and the repair facility may agree to follow a predictive payment model in order to forgo the estimation process and utilize an appropriately-determined fixed amount.

By the law of large numbers, it may be expected that an appropriately-determined fixed amount may, in the long term, result in a fair payment for both parties. Moreover, by potentially eliminating the detailed cost estimate and the post-repair negotiations, such a model may have the effect of reducing overall costs to both parties. For instance, repair facilities may need fewer qualified estimation and negotiation resources, and insurance providers may also need fewer oversight and negotiation resources.

After determining and assigning a standard amount for repair, the predictive claims computing platform may transmit the standard amount to a computing device associated with the repair facility. The predictive claims computing platform may further receive, from the computing device associated with the repair facility, a cost for actual repair of each vehicle in the plurality of vehicles after the actual repair for each vehicle has been completed. For example, the repair facility may initiate and complete repairs for all of the vehicles in the plurality of vehicles over a predetermined period of time (e.g., over 6 months, over a year, over 2 years, or over any other period of time). The repair facility may provide the actual costs for each vehicle repair to the insurance provider after all of the repairs have been completed or subsequently after each vehicle is repaired (e.g., on a one-by-one basis). After receiving the actual cost of vehicle repairs from the repair facility, the insurance provider may adjust the standard amount to reimburse the repair facility for future repairs based on identifying a difference between the standard amount and the cost for actual repair of each vehicle.

In some embodiments, the predictive claims computing platform (which may be referred to as a predictive claims system as described herein) may be integrated across a plurality of platforms and may be employed by an insurance provider that handles insurance claims and offers benefits or services to insured individuals (e.g., insurance policy holders). The insurance provider may also provide other entities with access to the features and functionality of the predictive claims computing platform, including entities such as auto part suppliers, rental car providers, repair shops, original equipment manufacturers (OEMs), and the like.

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

In one or more arrangements, teachings of the present disclosure may be implemented with a computing device. FIG. 1 illustrates a block diagram of an example repair device 100 that may be used in accordance with aspects of the present disclosure. The repair device 100 may be a specialized computing device programmed and/or configured to perform and carry out aspects associated with accessing the predictive system functionality and/or performing predictive determinations for insurance providers and repair facilities as described herein. The repair device 100 may have a repair manager 101 configured to perform methods and execute instructions as described herein. The repair manager 101 may be implemented with one or more specially configured processors and one or more storage units (e.g., databases, RAM, ROM, and other computer-readable media), one or more application specific integrated circuits (ASICs), and/or other hardware components. Throughout this disclosure, the repair manager 101 may refer to the software (e.g., a computer program or application) and/or hardware used to identify damage to each vehicle in a plurality of vehicles, determine a type of insurance coverage needed for repairing each vehicle based on the damage to each vehicle, identify geographic locations of repair facilitates for repairing damage to each vehicle, determine and assign a standard amount to reimburse the repair facilities for each repair, transmit the standard amount to repair facilities, receive costs for actual repairs for each vehicle, and adjust the standard amount to reimburse repair facilities for future repairs based on differences between the standard amount and costs for actual repairs for each vehicle. Specifically, the repair manager 101 may be a part of a predictive system that determines types of insurance coverage for each vehicle, assigns standard amounts for reimbursing repair facilities, and adjusts the standard amounts for reimbursing future repairs based on actual costs.

The one or more specially configured processors of the repair manager 101 may operate in addition to or in conjunction with another processor 103 of the repair device 100. In some examples, the repair manager 101 may be device including hardware and/or software configured to perform various functions. In some embodiments, the repair manager 101 may be a software module executed by one or more processors 103. Both the repair manager 101 and the processor 103 may be capable of controlling operations of the repair device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, gesture or other sensors, and/or stylus through which a user or insured individual associated with the repair device 100 may provide input data. The I/O module 109 may be configured to be connected to a display device 117, such as a monitor, television, touchscreen, and the like, and may include a graphics card. The display device 117 and input device 115 are shown as separate elements from the repair device 100, however, they may be within the same structure.

Using the input device 115, system administrators may update various aspects of the predictive system, such as rules or information related to claim processing rules for determining a standard amount for an insurance claim. Claim processing rules may comprise predefined rules determined by an insurance provider for processing insurance claims. In some cases, system administrators may update values of one or more metrics associated with claim processing rules using the input device 115 to update rules or information related to the predictive system, such as predetermined levels or thresholds for assessing damage, identifying insurance coverage types, assessing levels of quality of repairs completed by repair facilities, and the like. In other embodiments, the predictive system may be configured to automatically update claim processing rules for determining standard amounts, as well as predetermined levels or thresholds for assessing damage, identifying insurance coverage types, assessing levels of quality of repairs completed by repair facilities, and the like. For example, the predictive system may continuously monitor processed insurance claims and update rules automatically based on the data analysis of the processed insurance claims.

On some repair devices 100, the input device 115 may be operated by users (e.g., individuals insured by an insurance company) to interact with the predictive claims computing platform 100, including submitting images and/or information regarding damaged vehicles and insurance claims, receiving or providing information regarding settlements, sending contact information (e.g., to repair shops and rental companies), and the like, as described herein.

The memory 113 may be any computer readable medium for storing computer executable instructions (e.g., software). The instructions stored within memory 113 may enable the repair device 100 to perform various functions. For example, memory 113 may store software used by the repair device 100, such as an operating system 119 and application programs 121, and may include an associated database 123.

The network interface 111 allows the repair device 100 to connect to and communicate with a network 130. The network 130 may be any type of network, including a local area network (LAN) and/or a wide area network (WAN), such as the Internet. Through the network 130, the repair device 100 may communicate with one or more computing devices 140, such as laptops, notebooks, smartphones, personal computers, servers, and the like. The computing devices 140 may include at least some of the same components as repair device 100. In some embodiments the repair device 100 may be connected to the computing devices 140 to form a "cloud" computing environment.

The network interface 111 may connect to the network 130 via communication lines, such as coaxial cable, fiber optic cable, and the like or wirelessly using a cellular backhaul or a wireless standard, such as IEEE 802.11, IEEE 802.15, IEEE 802.16, and the like. In some embodiments, the network interface 111 may include a modem. Further, the network interface 111 may use various protocols, including TCP/IP, Ethernet, File Transfer Protocol (FTP), Hypertext Transfer Protocol (HTTP), and the like, to communicate with other computing devices 140.

FIG. 1 is an example embodiment of a repair device 100. In other embodiments, the repair device 100 may include fewer or more elements. For example, the repair device 100 may use the processor(s) 103 to perform functions of the repair manager 101, and thus, might not include a separate processor or hardware for the repair manager 101. Additionally, or alternatively, the repair device 100 may be a mobile device (e.g., a smartphone, tablet, and the like) specially configured to perform or carry out aspects of services described herein, and thus, may also include various other components, such as a battery, speaker, camera, and/or antennas (not shown).

Figure 2:
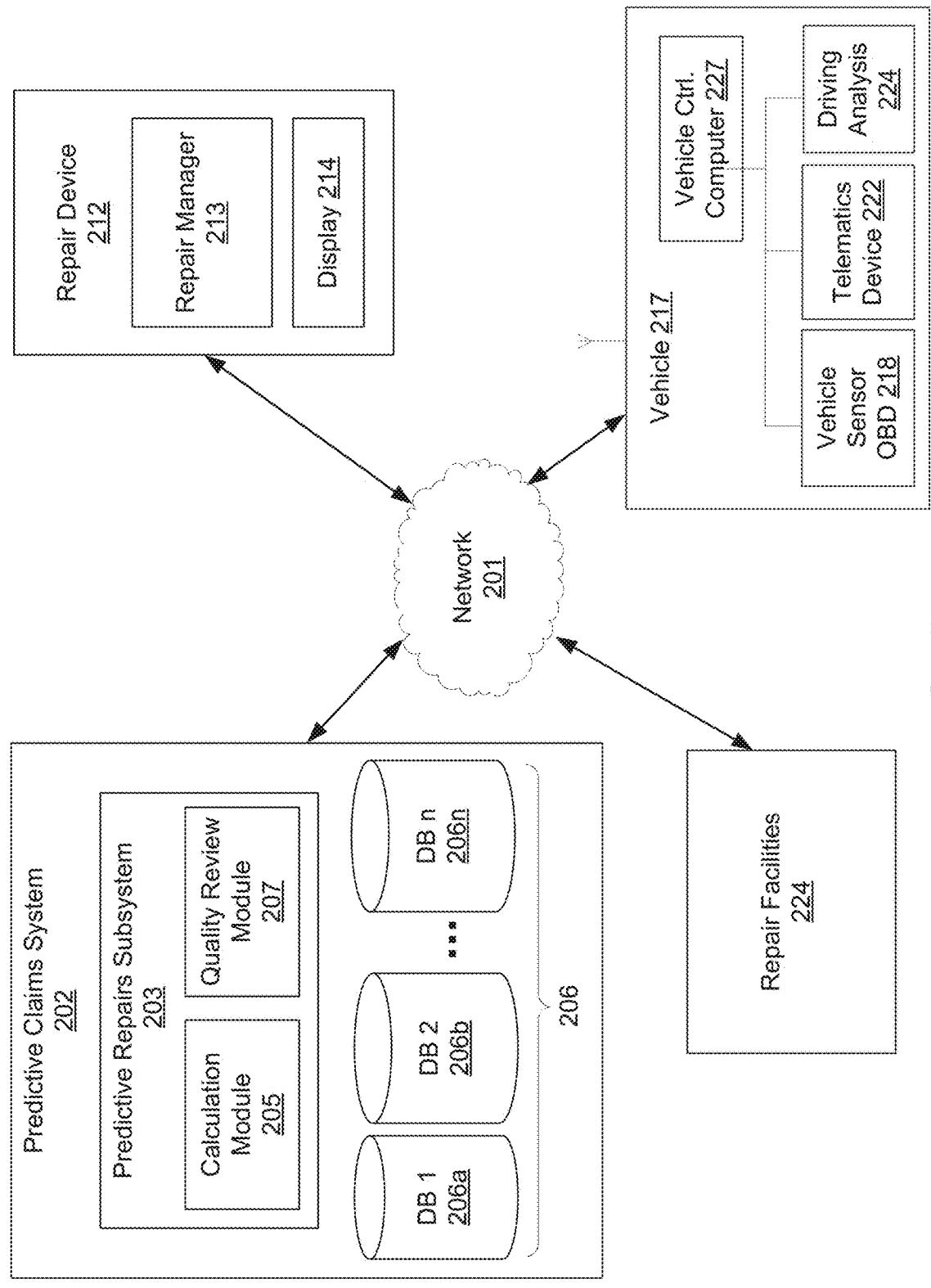
FIG. 2 depicts an example network environment in which various aspects of the present disclosure may be implemented in accordance with one or more example embodiments.

The computerized methods for streamlining insurance claim processes and managing repairs for insurance providers, customers, and repair facilities as disclosed herein may be implemented on one or more repair devices 100 used in various network environments. FIG. 2 illustrates an example network environment for implementing methods in accordance with aspects of the present disclosure.

As shown in FIG. 2, the network environment 200 may include a network 201 configured to connect a predictive claims system 202, repair device 212, vehicle 217, and computing devices associated with repair facilities 224. The repair device 212 may be the same as or at least similar to the repair device 100 described above with reference to FIG. 1. Collectively, these specialized computing devices may form at least a part of a predictive claims system. It is understood that there may be any number of components 212, 217, and 224 in the network environment 200. In at least some arrangements, the system may be expandable such that additional computing devices associated with other types of entities may be connected, as desired.

The network 201 may be any type of network, like the network 130 described above, and may use one or more communication protocols (e.g., protocols for the Internet (IP), Bluetooth, cellular communications, satellite communications, and the like) to connect computing devices and servers within the network environment 200 so they may send and receive communications between each other. In particular, the network 201 may include a cellular network and its components, such as cell towers.

Accordingly, for example, a repair device 212 (e.g., a smartphone, flip-phone, tablet, and the like) of an insured individual may communicate, via a cellular backhaul of the network 201, with a predictive claims system 202 to transmit information regarding damage to a vehicle 217 (e.g., at least one of one or more images of a damaged vehicle 217 or details about an accident, such as whether an airbag has deployed in the vehicle 217, whether the vehicle 217 is driveable, location of the vehicle 217, etc.) to an insurance provider, such as a part of the predictive claims service. For example, an individual may capture one or more photos of the damaged vehicle 217, and the repair device 212 may geotag the one or more photos of the damaged vehicle 217 with location data (e.g., geographic coordinates, street address, name of a neighborhood, city, state, zip code, and/or the like). In some cases, the repair device 212 may geotag any data transmitted to the predictive claims system 202 with location data. The repair device 212 may transmit the geotag data regarding the location of the vehicle 217 to the predictive claims system 202, so that the predictive claims system 202 may determine a repair facility within a predetermined radius of the location of the vehicle 217 based on the geotagged location data. In another example, an insurance agent, customer service representative, or a claims adjuster may use the repair device 212 to interact with the predictive system in determining predictive information related to insurance claims. In another embodiment, the repair device 212 may communicate back and forth with the predictive claims system 202 over the Internet, such as through a web portal.

In some embodiments, insurance providers may provide insurance policies to individuals and businesses to cover loss or damage of property. In return, a customer may remit payments (e.g., premiums) to the insurance providers. These payments may be done on a scheduled basis, such as monthly or yearly. The insurance policies may be specific and only cover loss or damage to the property from certain types of occurrences. Alternatively, insurance policies may be broad and cover loss or damage to the property or persons associated with the damaged property, incident or accident, or the like, from many different occurrences. There may be multiple properties that are covered by an insurance policy. Types of insurance policies may include vehicle insurance (including personal automobile, motorcycle, boat, and various commercial lines, etc.), homeowner insurance, renters insurance, commercial property insurance, and the like. As described herein, an insured individual or a customer may include any party that may report a loss to the insurance company, including, but not limited to, an insured party, third-party claimant, insurance agent, attorney, or public adjuster. Further, although several arrangements will be discussed herein in the context of automobile insurance, one or more aspects of the arrangements described herein may be used with various other types of insurance (e.g., homeowners, renters, motorcycle, boat, and the like).

When loss or damage occurs to an insured property, the customer may contact the insurance company to report the loss or damage and make a claim against their policy in order to obtain compensation for the loss or damage. Resources within or external to the insurance provider may handle the insurance claim and determine the amount, if any, of compensation due to the customer. The predictive claims system 202 may be configured to determine and assign a predetermined amount to reimburse a repair facility for repairing a plurality of vehicles 217 for insurance claims.

In some embodiments, there may be multiple vehicles 217, wherein each vehicle 217 may be covered by an insurance policy of an individual. Although FIG. 2 illustrates only one vehicle 217, the predictive claims system may be configured to communicate with a plurality of vehicles 217 simultaneously (e.g., at or around the same time), and the plurality of vehicles 217 may be associated with multiple individuals. The predictive system 202 may receive telematics data for multiple vehicles simultaneously and/or in real-time, analyze the telematics data to assess damages for multiple vehicles simultaneously and/or in real-time, determine types of insurance coverage needed based on damages for multiple vehicles simultaneously, identify locations of repair facilities for repairing the multiple vehicles simultaneously, assign a predetermined amount to reimburse repair facilities for each vehicle simultaneously, transmit the predetermined amount to reimburse the repair facilities simultaneously, receive actual repair costs for each vehicle repair from the repair facilities simultaneously, and adjust the predetermined amount to reimburse the repair facilities based on the actual repair costs simultaneously. The multiple vehicles 217 may be any type of vehicle, including a car, motorcycle, bicycle, scooter, drone (or other automated device), truck, bus, boat, plane, helicopter, and the like, wherein the multiple vehicles 217 may be the same or vary.

As illustrated in FIG. 2, vehicle 217 also includes vehicle operation sensor 218 capable of detecting and recording various conditions at the vehicle and operational parameters of the vehicle. For example, sensor 218 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensor 218 also may detect and store data received from the vehicle's 217 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (OBD).

Additional sensors 218 may detect and store the external driving conditions, for example, external temperature, rain, snow, light levels, and sun position for driver visibility. For example, external cameras and proximity sensors 218 may detect other nearby vehicles, vehicle spacing, traffic levels, road conditions, traffic obstructions, animals, cyclists, pedestrians, and other conditions that may factor into a driving data/behavior analysis. Sensor 218 also may detect and store data relating to moving violations and the observance of traffic signals and signs by the vehicle 217. Additional sensors 218 may detect and store data relating to the maintenance of the vehicle 217, such as the engine status, oil level, engine coolant temperature, odometer reading, the level of fuel in the fuel tank, engine revolutions per minute (RPMs), software upgrades, and/or tire pressure.

Vehicle sensor 218 also may include cameras and/or proximity sensors capable of recording additional conditions inside or outside of the vehicle 217. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensor 218 also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 217. Sensor 218 also may be configured to collect data relating to a driver's movements or the condition of a driver. For example, vehicle 217 may include sensors that monitor a driver's movements, such as the driver's eye position and/or head position, etc. Additional sensors 218 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors.

Certain vehicle sensors 218 also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras 218 may determine when and how often the vehicle 217 stays in a single lane or strays into other lane. A Global Positioning System (GPS), locational sensors positioned inside the vehicle 217, and/or locational sensors or devices external to the vehicle 217 may be used to determine the route, speed, lane position, road-type (e.g. highway, entrance/exit ramp, residential area, etc.) and other vehicle position/location data.

The data collected by vehicle sensor 218 (e.g., driving behavior data) may be stored and/or analyzed within the vehicle 217, such as for example by a driving analysis computer 224 integrated into the vehicle, and/or may be transmitted to one or more external devices. For example, as shown in FIG. 2, sensor data may be transmitted via a telematics device 222 to one or more remote computing devices, such as repair device 212, repair facilities 224, predictive claims system 202, and/or other remote devices.

As shown in FIG. 2, the data collected by vehicle sensor 218 may be transmitted to a predictive claims system 202, repair device 212, and/or additional external servers and devices via telematics device 222. Telematics device 222 may be one or more computing devices containing many or all of the hardware/software components as the repair manager 101 depicted in FIG. 1. The telematics device 222 may receive vehicle operation data and driving data from vehicle sensor 218, and may transmit the data to one or more external computer systems (e.g., predictive claims system 202, insurance system server of an insurance company, financial institution, or other entity) over a wireless transmission network. Telematics device 222 also may be configured to detect or determine additional types of data relating to real-time driving and the condition of the vehicle 217. The telematics device 217 also may store the type of vehicle 217, for example, the make, model, trim (or sub-model), year, and/or engine specifications, as well as other information such as vehicle owner or driver information, insurance information, and financing information for the vehicle 217.

In some cases, the telematics device 222 may be a device that is plugged into the vehicle's 217 on-board diagnostic (OBD) system (e.g., plugged in through an OBD II connector) or otherwise installed in the vehicle 217 in order to collect data. The telematics device 222 may also collect GPS coordinates, such as through its own GPS receiver. In the example shown in FIG. 2, the telematics device 222 may receive vehicle driving behavior data from vehicle sensor 218, and may transmit the data to a predictive claims system 202. As mentioned above, this driving behavior data may include data indicative of one or more vehicle metrics or vehicle telematics data, such as based on a driver's speed, acceleration, braking, steering, turn signals, and the like. In other examples, one or more of the vehicle sensors 218 or systems may be configured to receive and transmit data directly from or to a predictive system 202 without using a telematics device. For instance, telematics device 222 may be configured to receive and transmit data from certain vehicle sensors 218 or systems, while other sensors or systems may be configured to directly receive and/or transmit data to a predictive system 202 without using the telematics device 222. Thus, telematics device 222 may be optional in certain embodiments.

Furthermore, there may be a driver associated with each vehicle 217, in which the driver is an insured individual or customer of the insurance customer. Additionally or alternatively, a driver may be associated with the vehicle 217 if the driver is identified on an insurance policy that insures the vehicle 217. A driver of the vehicle 217 may interact with and operate a repair device 212. In some embodiments, an insured individual or customer of the insurance company may operate a repair device 212 to interface with the predictive claims system 202. The insured individual may be enrolled in a service that allows the individual to benefit from the predictive service. In some embodiments, the repair device 212 may be a specialized mobile device (e.g., mobile phone), a tablet, laptop, personal computer, and the like configured to perform or carry out aspects associated with predictive services described herein. The repair device 212 may belong to a driver, individual, or customer of an insurance company. In some cases, the repair device 212 may be at an insurance company, and data may be transmitted between the driver and the device 212. Although only one repair device 212 is illustrated in FIG. 2, there may be any number of repair devices 212, wherein each repair device 212 is associated with at least one driver.

The repair device 212 may further comprise a repair manager 213 and a display 214. The repair device 212 may be configured to execute the repair manager 213 that presents a user interface (e.g., a graphical user interface for a website, application, software program, and the like) on the display 214. The display 214 may comprise a monitor, television, touchscreen, and the like. The user interface of the repair manager 213 may allow users to send and/or receive data and notifications regarding insurance claims, damages, compensation, settlement offers, resources, and the like. The user interface may also allow individuals to update account information or preferences for services provided by the predictive claims system 202.

The repair manager 213 may be a self-sufficient program or may be a module of another program, such as a program used to collect information utilized by the predictive claims system 202. The repair manager 213 may be configured in a similar manner as the repair manager 101 or configured to perform similar functions as those performed by the repair manager 101.

In some embodiments, the repair manager 213 may be downloaded or otherwise installed onto the repair device 212 using known methods. Different devices may install different versions of the repair manager 213 depending on their platform. For example, a repair device 212 (e.g., a smartphone) running a first operating system may download a different version of the repair manager 213 than a repair device 212 running a second operating system, different from the first operating system.

An individual or user may launch the repair manager 213 by, for example, operating buttons or a touchscreen on the repair device 212. Additionally, or alternatively, the repair device 212 may be configured to execute a web browser (e.g., an application for accessing and navigating the Internet) to access a web page providing an interface for the predictive system. In some embodiments, the repair device 212 may also be configured to collect information. For example, the repair manager 213 or another program installed on the repair device 212 may instruct the repair device 212 to collect data. For example, the repair manager 213 may collect one or more images of vehicle damage, in which images may be captured by a camera installed on the repair device 212. Once the data (e.g., one or more images of vehicle damage) has been collected, the repair manager 213 may be configured to send the collected data to the predictive claims system 202 instantaneously, automatically, or at a later time.

FIG. 2 also illustrates repair facilities 224, which may represent one or more computing devices that are operated by employees at the repair facilities 224. The repair facilities 224 may be connected to the predictive claims system 202 through one or more servers or systems that are communicatively coupled through the network 201. For example, the predictive claims system 202 may determine a standard amount to assign to the repair facilities 224 in order to reimburse the repair facilities 224 for repairing each vehicle 217 based on a type of insurance coverage needed and the location(s) of the repair facilities 224.

FIG. 2 further illustrates example subsystems within the network environment 200. That is, the predictive claims system 202 may comprise a predictive repairs subsystem 203 and a plurality of databases 206. The predictive repairs subsystem 203 may include one or more application servers, computing devices, and other equipment (e.g., conference bridge equipment) used by entity (e.g., insurance provider) personnel to implement and provide the resource services described herein. For example, the predictive repairs subsystem 203 may include a calculation module 205 (e.g., which may be a part of a predictive claims computing platform) that is configured with programmed instructions (e.g., a predictive algorithm) to analyze one or more images of damaged vehicles, identify specific auto parts to be repaired based on image analysis, determine a type of insurance coverage for each vehicle, and determine and assign predetermined amounts to reimburse repair facilities 224 for repairing the vehicles 217.

The predictive repairs subsystem 203 may also include a quality review module 207 which may be configured with one or more rules and logic for assessing the quality of repairs performed by the repair facility 224. For example, the predictive repairs subsystem 203 may transmit a request for performing a quality review to one or more repair facilities 224, and the predictive repairs subsystem 203 may further receive a confirmation from the one or more repair facilities 224 for performing the quality review. The quality review module 207 may be configured to determine whether the plurality of vehicles 217 that have been repaired by the one or more repair facilities 224 pass inspection standards. For example, the inspection standards may comprise industry standards, original equipment (OE) standards, safety regulations, and/or standards set by different manufacturers. Different manufacturers may have different standards such as for repairing certain vehicle parts while replacing other vehicle parts. In some cases, the quality review module 207 may utilize an algorithm to determine/check whether standards have been met, such as by checking headlights on a vehicle, checking wipers on the vehicle, determining if paint on the vehicle is free of defects, and the like. The predictive repairs subsystem 203 may also capture and/or utilize one or more photos of the vehicle being repaired to document the repair procedure (which may be useful for quality checks).

Thus, the quality review module 207 may determine whether the various standards have been met in vehicle repairs by the one or more repair facilities 224, and the quality review module 207 may also identify customer satisfaction of quality of repairs performed by one or more repair facilities 224 based on one or more surveys, number of insurance policy renewals from customers, and number of returns to the one or more repair facilities 224 for additional repairs. For example, the quality review module 207 may determine customer satisfaction based on retention of customers and based on how often customers returned to a repair facility 224 for vehicles that were not repaired according to the customer's satisfaction. The repair facilities 224 may be responsible for repairing vehicles according to the industry standards and to the customer's satisfaction, such that a predetermined level for quality of repairs is met.

If the quality review module 207 determines that one or more insurance standards have not been met by a particular repair facility 224 and/or that the repair facility 224 does not achieve the predetermined level of quality for repairs, then the predictive repairs subsystem 203 may remove the particular repair facility 224 from a network of repair facilities (e.g., network of service providers) that may be partnered with the insurance provider for the predictive claims services disclosed herein. In some cases, a repair facility 224 that has been removed from the predictive claims services may be given one or more opportunities to be re-entered into the network of repair facilities after a predetermined period of time and additional review. In other embodiments, the quality review module 207 may review a predetermined subset (e.g., a predetermined percentage) of the vehicles 217 that are repaired by the repair facility 224 to assess quality of repairs conducted by the repair facility 224.

In additional embodiments, the calculation module 205 may identify damaged auto parts based on comparing images of damaged vehicles with previous images obtained from historical insurance data. In some embodiments, the calculation module 205 may determine that certain damaged auto parts (e.g., front bumper or another auto part) may have higher fixed fees for repair than the fees for repairing other damaged auto parts (e.g., back bumper or another auto part) in a vehicle. The differences in fees for repair may be a result of more extensive damage occurring in different parts of the vehicle, and replacement or repair of some auto parts may be more expensive than other auto parts. The calculation module 205 may utilize predefined threshold values and filters to identify predictive outcomes for determining repair costs. The calculation module 205 may access and parse these predefined threshold values and metrics which may be stored in one or more databases (such as databases 206).

The predictive repairs subsystem 203 may include functionality that may be distributed among a plurality of computing devices. For example, the predictive repairs subsystem 203 may comprise further subsystems, including client-side subsystems and server-side subsystems. The client-side subsystem may interface with the repair device 212, the plurality of vehicles 217, and/or the repair facilities 224, whereas the server-side subsystem may interface with application servers and computing devices which handle a variety of tasks related to for determining standard amounts for repairing vehicles to reimburse to the repair facilities 224 without having to provide an estimate prior to repair.

The subsystems, application servers, and computing devices of the predictive repairs subsystem 203 may also have access to the plurality of databases 206. In some embodiments, the plurality of databases 206 may be incorporated into the predictive repairs subsystem 203 or may be separate components in the predictive repairs subsystem 203. The plurality of databases 206 may contain information belonging to or maintained by an insurance company, government entity, and/or third-party. For privacy protection reasons, access to the information in these databases 206 may be restricted to only authorized computing devices and for only permissible purposes. For example, a database 206 may comprise a computer internal to an insurance company that contains customer policy information. A database 206 may also contain policy information for a plurality of individuals, including but not limited to, each individual's relevant coverage limits/deductibles with insurance carriers, each individual's address information and other personal information, and any other information apparent to one skilled in the art.

As an example, the plurality of databases 206 (e.g., databases 206a-206n) may comprise an accounts and billing database, an insurance policy and claims database, historical insurance database, vehicle telematics database, a claims adjuster rules database, repair facilities database, parts damage database, repair time database, quality check rules database and other databases. For example, the databases may store insurance information regarding insurance policies of insured individuals, such as data regarding an account holder, insured individuals, an insurance policy number, insurance coverage, premiums, deductibles, billing information, payment history, address/location information, and the like. The database may include information regarding previous insurance claims (e.g., related to accidents) for specific vehicles of different vehicle models, as well as predefined rules for processing insurance claims, different types of insurance coverage, and the like. In some embodiments, different types of insurance coverage may include collision insurance coverage and liability insurance coverage, in which collision insurance coverage may cover expenses related to damage or destruction to a vehicle that has been in a roadside incident or collision, whereas liability insurance coverage may cover expenses for damages for when an insured driver is at fault for causing damages to another party's (e.g., a third party's) vehicle.

The data stored in the plurality of databases 206 may be collected and compiled by the repair device 212, the predictive repairs subsystem 203, or by servers and subsystems within the predictive repairs subsystem 203. In another example, one or more databases 206 may also include predefined rules and other information to enable the methods disclosed herein. For example, one or more databases 206 may contain historical claim data, or other applicable data archived by the insurance company (e.g., historical images of damaged vehicles from previous accidents/roadside incidents, parts damage/severity, accident characteristics (e.g., nature of accident, speed at which accident occurred, etc.)). This data may be used, among other things, to optimize the rules and/or techniques used in the method and systems disclosed herein.

In some embodiments, the predictive claims system 202 may use at least one of a type of insurance coverage needed, a location of a repair facility 224, type of vehicle (e.g., vehicle make, vehicle model, and/or year), and historical data regarding claims information and claim adjuster rules (e.g., decisioning rules) in order to determine standard amounts to reimburse the repair facility 224 for vehicle repair. For example, the predictive claims system 202 may determine a first amount for reimbursement for a first type of insurance coverage (e.g., collision insurance coverage) and a second amount for reimbursement for a second type of insurance coverage (e.g., liability insurance coverage). In another example, the predictive claims system 202 may determine a standard amount for reimbursement based on location of the repair facility 224, such that a first repair facility 224 in a first location (e.g., state of California) may be assigned a higher standard amount for reimbursement than a second repair facility 224 in a second location (e.g., state of Georgia). In yet another example, the predictive claims system 202 may take into account the type of vehicle and exclude vehicles of certain vehicle makes, models, and/or years (e.g., high-end vehicles) from predictive repair services.

Additionally, the predictive claims system 202 may determine which specific auto parts are damaged in a vehicle 217 based on analyzing telematics data received from the telematics device 222 in the vehicle 217 after a collision or roadside incident. The predictive claims system 202 may use this information to determine the type of insurance coverage needed and may provide this information to repair facilities 224.

In other embodiments, the predictive claims system 202 may receive information from a driver of the vehicle 217 regarding a collision and damage to the vehicle 217. For example, a driver may get into an accident and may subsequently upload one or more images of his or her damaged vehicle 217 to the predictive claims system 202 through the repair device 212. The predictive claims system 202 may receive the one or more images of the damaged vehicle 217, determine a type of insurance coverage for the vehicle 217, identify repair facilities 224 that are nearby the location of the vehicle 217, and determine a standard amount for reimbursing a repair facility 224 based on the insurance coverage type and the location of the repair facility 224.

The predictive claims system 202 may also interface with rental car agencies in order to determine how long an individual's vehicle may be out of commission (e.g., being repaired at a repair facility). Based on previous data on how long certain repairs take for specific auto parts (as determined from, for example, historical repair data), the predictive claims system 202 may be able to identify a length of time for which an individual may need a rental car. In some cases, the insurance provider may incentivize repair facilities 224 to complete repairs within a predetermined period of time, in order to decrease the amount of time that the individual is without his vehicle 217 and to reduce costs for rental cars.

In additional embodiments, the predictive claims system 202 may be able to modify standard amounts for reimbursing repair facilities 224 based on data regarding actual costs of repairs received from the repair facilities 224. That is, the predictive claims system 202 may continuously update predetermined reimbursement amounts provided for different types of repair in the future and may also conduct quality checks to evaluate the quality of repairs performed by the repair facilities 224.

Ultimately, the predictive claims system 202 may provide standard amounts for reimbursement to repair facilities 224 (e.g., repair shops, body shops, or parts suppliers), without first providing an estimate that is then taken to the service provider and used to determine a final repair cost. The predictive claims system 202 may be useful for providing quick and efficient claim settlements for drivers by assigning predetermined amounts for reimbursing to repair facilities 224 for repairing a plurality of vehicles 217.

Figure 3:
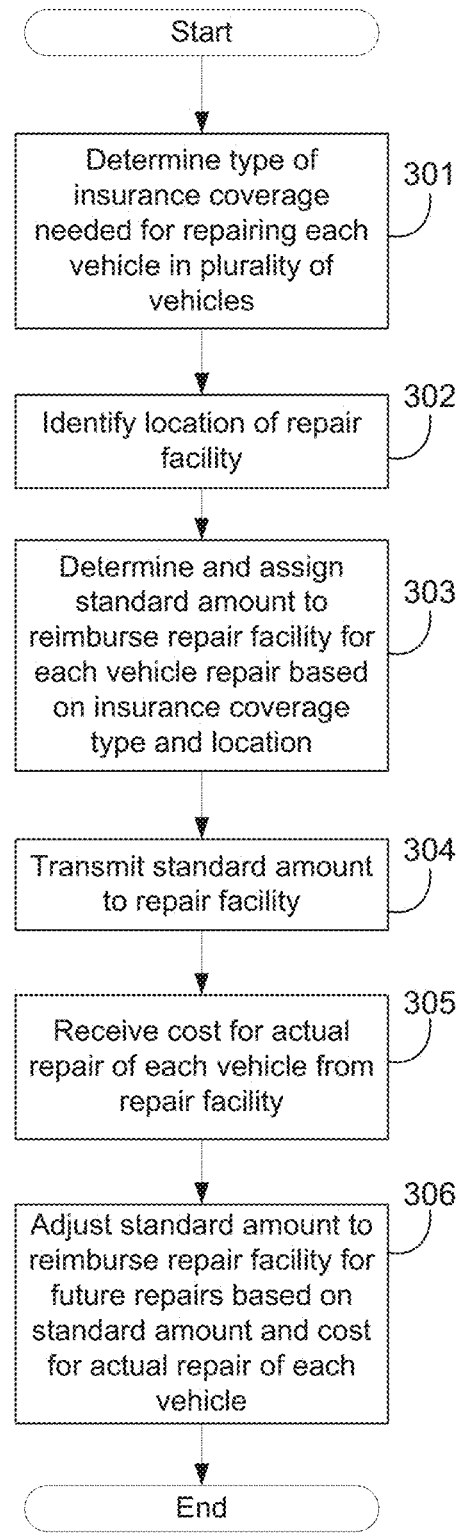
FIG. 3 depicts a flow diagram of example method steps in accordance with one or more example embodiments.

FIG. 3 illustrates a flow diagram of an example method in accordance with aspects of the present disclosure. The steps of FIG. 3 may be performed by subsystems, application servers, and computing devices of the predictive claims system 202 (e.g., predictive repairs subsystem 203). One or more of the steps of FIG. 3 may be performed by executing a predictive repair program (e.g., a predictive repair mobile application) and/or by operating a particularly configured computing device of the predictive claims system 202.

The method of FIG. 3 may begin with step 301, at which the predictive system may determine a type of insurance coverage needed for repairing each vehicle in a plurality of vehicles. For example, the predictive claims system 202 may determine a type of insurance coverage needed for repairing each vehicle 217 in a plurality of vehicles based on damage to each vehicle 217. In some cases, the predictive claims system 202 may receive information regarding damage of a vehicle 217 from a user at a repair device 212 (e.g., information provided via the repair manager 213) or from a telematics device 222 in the vehicle 217. At step 302, the predictive system may identify a location of a repair facility. For example, the predictive claims system 202 may identify a geographic location of one or more repair facilities 224 for repairing the damage to each vehicle 217. In some cases, the driver of each vehicle 217 may select a repair facility 224 from a list of available and/or preferred service providers, and the predictive claims system 202 may identify the location of the selected repair facility 224.

At step 303, the predictive system may determine and assign a standard amount to reimburse the repair facility for repairing each vehicle in the plurality of vehicles. For example, the predictive claims system 202 may determine and assign a standard amount to reimburse the repair facility 224 for repairing each vehicle 217 based on the type of insurance coverage needed and the location of the repair facility 224. At step 304, the predictive system may transmit the standard amount to the repair facility. For example, the predictive claims system 202 may transmit data regarding the determined amount to a computing device associated with the repair facility 224.

At step 305, the predictive system may receive a cost for actual repair of each vehicle from the repair facility. For example, the predictive claims system 202 may receive, from the repair facility 224, a cost for actual repair of each vehicle 217 in the plurality of vehicles 217 after the actual repair for each vehicle 217 has been completed. At step 306, the predictive system may adjust the standard amount to reimburse the repair facility for future repairs based on the standard amount and cost for actual repair of each vehicle. For example, the predictive claims system 202 may adjust the standard amount to reimburse the repair facility 224 for future repairs based on identifying a difference between the standard amount and the cost for actual repair of each vehicle 217 in the plurality of vehicles 217. In some cases, the predictive claims system 202 may identify that the cost for actual repair of each vehicle 217 is higher than the standard amount reimbursed to the repair facility 224 for repairing each vehicle 217. The predictive claims system 202 may thus adjust the standard amount by a predefined percentage to reimburse the repair facility 224 less for future repairs.

Figure 4:
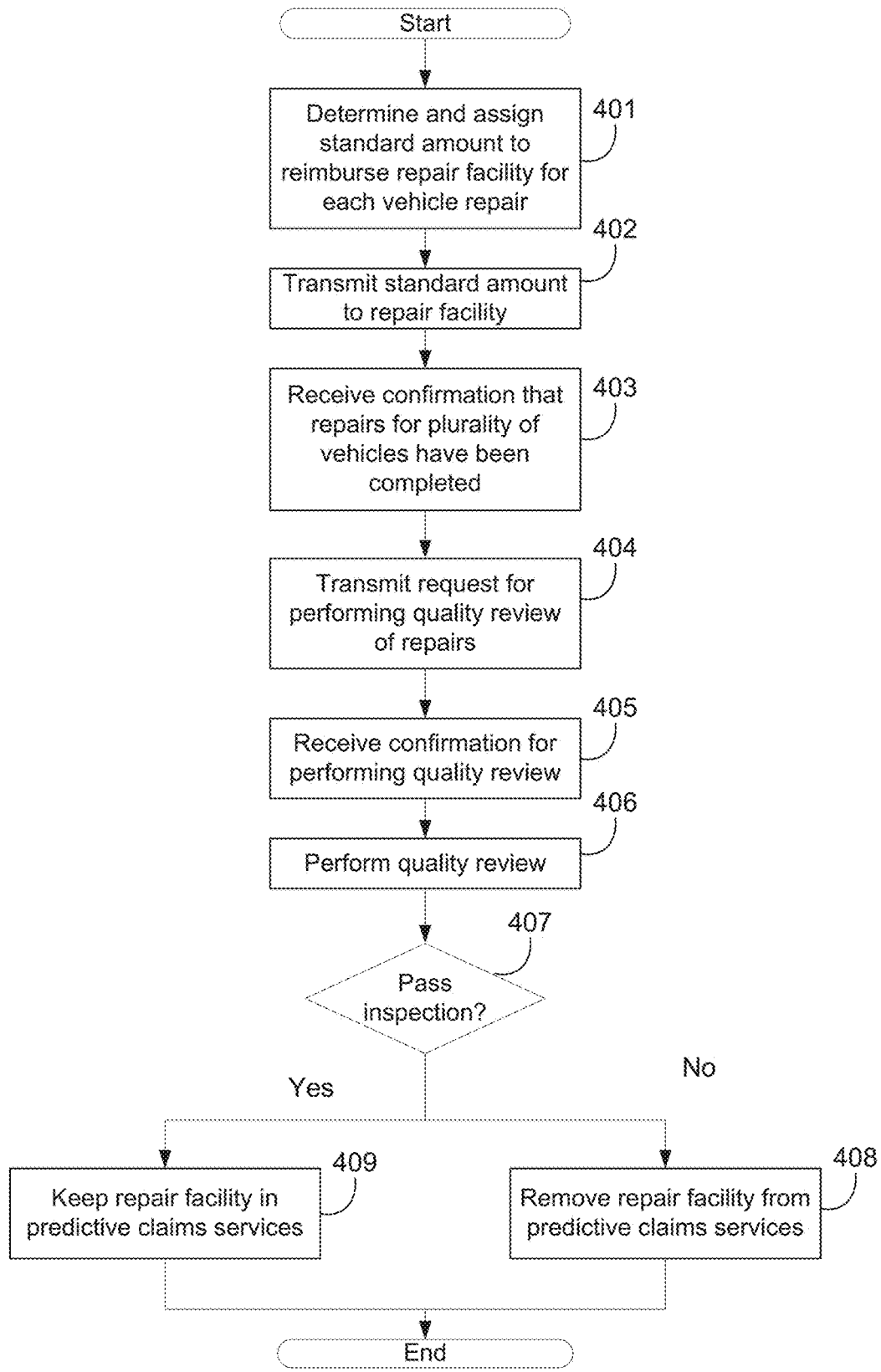
FIG. 4 depicts a flow diagram of example method steps in accordance with one or more example embodiments.

FIG. 4 illustrates a flow diagram of an example method in accordance with aspects of the present disclosure. The steps of FIG. 4 may be performed by subsystems, application servers, and computing devices of the predictive claims system 202 (e.g., predictive repairs subsystem 203). One or more of the steps of FIG. 4 may be performed by executing a predictive repair program (e.g., a predictive repair mobile application) and/or by operating a particularly configured computing device of the predictive claims system 202.

The method of FIG. 4 may begin with step 401, at which the predictive system may determine and assign a standard amount to reimburse the repair facility for each vehicle repair for a plurality of vehicles. For example, the predictive claims system 202 may determine and assign a standard amount to reimburse the repair facility 224 for repairing each vehicle 217 in the plurality of vehicles 217 based on a type of insurance coverage needed for each vehicle 217 and based on the location of the repair facility 224. At step 402, the predictive system may transmit the standard amount to the repair facility. For example, the predictive claims system 202 may transmit data regarding the determined amount to a computing device associated with the repair facility 224.

At step 403, the predictive system may receive confirmation that repairs for the plurality of vehicles have been completed. For example, the predictive claims system 202 may receive confirmation from the repair facility 224 after each vehicle 217 is repaired or after all of the vehicles 217 in the plurality of vehicles 217 have been repaired. In some cases, the predictive claims system 202 may receive confirmation of the completion of repairs after a predetermined period of time following each repair to account for customers who may need to return to the repair facility for additional repairs (e.g., for repairing or replacing vehicle parts that were not fixed properly during the customer's first visit to the repair facility).

At step 404, the predictive system may transmit a request for performing quality review of repairs to the repair facility. For example, the predictive claims system 202 may transmit to the repair facility 224, a request for performing a quality review to evaluate quality of repairs conducted by the repair facility 224. At step 405, the predictive system may receive confirmation for performing the quality review. For example, the predictive claims system 202 may receive a confirmation for performing the quality review from the repair facility 224.

At step 406, the predictive system may perform the quality review. For example, the predictive claims system 202 may evaluate a predetermined subset (e.g., a predetermined percentage) of the vehicles 217 that are repaired by the repair facility 224 to assess quality of repairs conducted by the repair facility 224. The predictive claims system 202 may determine whether various standards have been met in vehicle repairs by the repair facility 224, such as by inspecting repairs using industry standards, original equipment (OE) standards, safety regulations, and/or standards set by different manufacturers. The predictive claims system 202 may also perform the quality review by evaluating customer satisfaction of repair based on one or more surveys, number of insurance policy renewals from customers, and number of returns to the repair facility 224 for additional repairs.

At step 407, the predictive system may determine if the repair facility has passed inspection based on the quality review. For example, the predictive claims system 202 may determine whether the predetermined subset of vehicles repaired by the repair facility 224 meet the standards for inspection, including OE standards, safety regulations, and the like. In some cases, the predictive claims system 202 may utilize a predetermined threshold (e.g., a percentage of passing vehicle repairs or a predetermined level of quality of repairs completed by the repair facility) for determining if a repair facility has passed inspection.

If the predetermined subset of vehicles repaired by the repair facility does not pass the inspection from the quality review, then the method in this example proceeds to step 408, in which the predictive claims system 202 may remove the repair facility 224 from the predictive claims services. If the predetermined subset of vehicles repaired by the repair facility 224 passes the inspection from the quality review, then the method in this example proceeds to step 409, in which the predictive claims system 202 may keep the repair facility 224 in the predictive claims services.

In additional embodiments, the predictive claims system 202 may provide a payment for repairs to the repair facility 224, in which the payment comprises the determined standard amount for each vehicle 217 in a plurality of vehicles 217. For example, the predictive claims system 202 may determine that the standard amount is $2,000 for an insurance provider to reimburse the repair facility 224 for a collision insurance coverage claim in a certain location (e.g., in California). If there are 1,000 collision insurance coverage claims, then the predictive claims system 202 may determine that the insurance provider will pay $2 million to the repair facility for repairing each vehicle involved in the 1,000 collision insurance coverage claims (e.g., in which each insurance claim corresponds to a vehicle). In some cases, the predictive claims system 202 may transmit the $2 million to the repair facility on behalf of the insurance provider prior to the repairs being performed for the 1,000 vehicles. In other cases, the predictive claims system 202 may transmit $2,000 to the repair facility on behalf of the insurance provider prior to each vehicle repair being performed.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system comprising:
   a first computing device disposed within or proximate to a vehicle;
   a second computing device associated with a repair facility;
   a telematics device disposed within the vehicle and communicatively coupled to an on-board diagnostic system of the vehicle, the telematics device comprising a GPS receiver;
   a sensor communicatively coupled to the telematics device and the on-board diagnostic system;
   a network; and
   a server, comprising hardware including one or more processors and memory, the server communicatively coupled to the first computing device, the second computing device and the telematics device via the sensor, the server configured to:
      capture, via the telematics device using the sensor, sensor data regarding at least one of operating state of the vehicle and driving behavior;
      determine, by the telematics device, global positioning identifier (GPS) coordinates associated with a geographical location of the vehicle;
      based on the determined GPS coordinates, geotag the sensor data regarding the operating state of the vehicle;
      based on a determined geotag, identify a location of a repair facility for repairing the vehicle;
      cause the first computing device to capture an image of the vehicle;
      based on the captured image of the vehicle and the sensor data, determine damage information associated with the at least one of the operating state of the vehicle and driving behavior;
      calculate a standard amount to reimburse the repair facility for repairing the vehicle based on the damage information, on the location of the repair facility, and on data indicating costs of previous repairs to other vehicles;
      transmit the standard amount to the second computing device associated with the repair facility;
      receive, from the second computing device associated with the repair facility, a cost for actual repair of the vehicle after the actual repair for the vehicle has been completed; and
      adjust the standard amount to reimburse the repair facility for future repairs based on identifying a difference between the standard amount and the cost for actual repair of the vehicle.

2. The system of claim 1, wherein the vehicle is one of a plurality of vehicles, the system further comprising a plurality of user devices respectively associated with each vehicle in the plurality of vehicles, wherein the server is further configured to:
- transmit, to each user device in the plurality of user devices, a request for information regarding a respective user regarding each vehicle;
- receive, from each user device, the sensor data; and
- determine a type of insurance coverage for repairing each vehicle based on the sensor data.

3. The system of claim 1, wherein the actual repair for the vehicle occurs over a predetermined period of time.

4. The system of claim 1, wherein the server is further configured to:
- identify that the cost for actual repair of the vehicle is higher than the standard amount reimbursed to the repair facility for repairing the vehicle; and
- adjust the standard amount by a percentage to reimburse the repair facility less for future repairs.

5. The system of claim 1, wherein the server is further configured to:
- transmit, to the second computing device associated with the repair facility, a request for performing a quality review to evaluate quality of repairs conducted by the repair facility; and
- receive, from the second computing device associated with the repair facility, a confirmation for performing the quality review.

6. The system of claim 5, wherein performing the quality review further comprises:
- determining, by the server, that a plurality of vehicles comprising the vehicle pass inspection standards; and
- identifying, by the server, customer satisfaction of quality of repairs based on one or more surveys, number of insurance policy renewals from customers, and number of returns to the repair facility for additional repairs.

7. The method of claim 5, wherein performing the quality review further comprises:
- determining, by the server, that one or more inspection standards have not been met by the repair facility; and
- removing, by the server, the repair facility from a network of repair facilities.

8. A method performed by a computing system comprising a first computing device disposed within or proximate to a vehicle, a second computing device associated with a repair facility, a telematics device disposed within the vehicle and communicatively coupled to an on-board diagnostic system of the vehicle, the telematics device comprising a GPS receiver, a sensor communicatively coupled to the telematics device and the on-board diagnostic system, a network, and a server comprising hardware including one or more processors and memory, the server communicatively coupled to the first computing device, the second computing device and the telematics device via the sensor, the method comprising:
- capturing, by the server via the telematics device using the sensor, sensor data regarding at least one of operating state of the vehicle and driving behavior;
- determining, by the server via the telematics device, global positioning identifier (GPS) coordinates associated with a geographical location of the vehicle;
- based on the determined GPS coordinates, geotagging, by the server, the sensor data regarding the operating state of the vehicle;
- based on a determined geotag, identifying, by the server, a location of a repair facility for repairing the vehicle;
- causing, by the server, the first computing device to capture an image of the vehicle;
- based on the captured image of the vehicle and the sensor data, determining, by the server, damage information associated with the at least one of the operating state of the vehicle and driving behavior;
- calculating, by the server, a standard amount to reimburse the repair facility for repairing the vehicle based on the damage information, on the location of the repair facility, and on data indicating costs of previous repairs to other vehicles;
- transmitting, by the server, the standard amount to the second computing device associated with the repair facility;
- receiving, by the server from the second computing device associated with the repair facility, a cost for actual repair of the vehicle after the actual repair for the vehicle has been completed; and
- adjusting, by the server, the standard amount to reimburse the repair facility for future repairs based on identifying a difference between the standard amount and the cost for actual repair of the vehicle.

9. The method of claim 8, wherein the vehicle is one of a plurality of vehicles, the computing system further comprising a plurality of user devices respectively associated with each vehicle in the plurality of vehicles, the method further comprising:
- transmitting, by the server to each user device in the plurality of user devices, a request for information regarding a respective user regarding each vehicle;
- receiving, by the server from each user device, the sensor data; and
- determining, by the server, a type of insurance coverage for repairing each vehicle based on the sensor data.

10. The method of claim 8, wherein the actual repair for the vehicle occurs over a predetermined period of time.

11. The method of claim 8, the method further comprising:
- identifying, by the server, that the cost for actual repair of the vehicle is higher than the standard amount reimbursed to the repair facility for repairing the vehicle; and
- adjusting, by the server, the standard amount by a percentage to reimburse the repair facility less for future repairs.

12. The method of claim 8, the method further comprising:
- transmitting, by the server to the second computing device associated with the repair facility, a request for performing a quality review to evaluate quality of repairs conducted by the repair facility; and
- receiving, by the server from the second computing device associated with the repair facility, a confirmation for performing the quality review.

13. The method of claim 12, wherein performing the quality review further comprises:
- determining, by the server, that a plurality of vehicles comprising the vehicle pass inspection standards; and
- identifying, by the server, customer satisfaction of quality of repairs based on one or more surveys, number of insurance policy renewals from customers, and number of returns to the repair facility for additional repairs.

14. The method of claim 12, wherein performing the quality review further comprises:
- determining, by the server, that one or more inspection standards have not been met by the repair facility; and
- removing, by the server, the repair facility from a network of repair facilities.

15. One or more non-transitory computer-readable media associated with a memory and a processor of a computing system comprising a first computing device disposed within or proximate to a vehicle, a second computing device associated with a repair facility, a telematics device disposed within the vehicle and communicatively coupled to an on-board diagnostic system of the vehicle, the telematics device comprising a GPS receiver, a sensor communicatively coupled to the telematics device and the on-board diagnostic system, a network, and a server comprising hardware including one or more processors and memory, the server communicatively coupled to the first computing device, the second computing device and the telematics device via the sensor, the one or more non-transitory computer-readable media comprising computer-executable instructions stored in the memory, the instructions, when executed by the processor, causing the computing system to perform operations comprising:

capturing, by the server via the telematics device using the sensor, sensor data regarding at least one of operating state of the vehicle and driving behavior;

determining, by the server via the telematics device, global positioning identifier (GPS) coordinates associated with a geographical location of the vehicle;

based on the determined GPS coordinates, geotagging, by the server, the sensor data regarding the operating state of the vehicle;

based on a determined geotag, identifying, by the server, a location of a repair facility for repairing the vehicle;

causing, by the server, the first computing device to capture an image of the vehicle;

based on the captured image of the vehicle and the sensor data, determining, by the server, damage information associated with the at least one of the operating state of the vehicle and driving behavior;

calculating, by the server, a standard amount to reimburse the repair facility for repairing the vehicle based on the damage information, on the location of the repair facility, and on data indicating costs of previous repairs to other vehicles;

transmitting, by the server, the standard amount to the second computing device associated with the repair facility;

receiving, by the server from the second computing device associated with the repair facility, a cost for actual repair of the vehicle after the actual repair for the vehicle has been completed; and adjusting, by the server, the standard amount to reimburse the repair facility for future repairs based on identifying a difference between the standard amount and the cost for actual repair of the vehicle.

16. The media of claim 15, wherein the vehicle is one of a plurality of vehicles, the computing system further comprising a plurality of user devices respectively associated with each vehicle in the plurality of vehicles, the operations further comprising:

transmitting, by the server to each user device in the plurality of user devices, a request for information regarding a respective user regarding each vehicle;

receiving, by the server from each user device, the sensor data; and determining, by the server, a type of insurance coverage for repairing each vehicle based on the sensor data.

17. The media of claim 15, wherein the actual repair for the vehicle occurs over a predetermined period of time.

18. The media of claim 15, the operations further comprising:

identifying, by the server, that the cost for actual repair of the vehicle is higher than the standard amount reimbursed to the repair facility for repairing the vehicle; and adjusting, by the server, the standard amount by a percentage to reimburse the repair facility less for future repairs.

19. The media of claim 15, the operations further comprising:

transmitting, by the server to the second computing device associated with the repair facility, a request for performing a quality review to evaluate quality of repairs conducted by the repair facility; and receiving, by the server from the second computing device associated with the repair facility, a confirmation for performing the quality review.

20. The media of claim 19, wherein performing the quality review further comprises one of:

determining, by the server, that a plurality of vehicles comprising the vehicle pass inspection standards; and identifying, by the server, customer satisfaction of quality of repairs based on one or more surveys, number of insurance policy renewals from customers, and number of returns to the repair facility for additional repairs; or determining, by the server, that one or more inspection standards have not been met by the repair facility; and removing, by the server, the repair facility from a network of repair facilities.

\* \* \* \* \*